(No Model.) 2 Sheets—Sheet 1.

E. CLIFF.
CAR TRUCK.

No. 539,934. Patented May 28, 1895.

Witnesses:
Mark W. Dewey
R. S. Dewey

Inventor.
Edward Cliff
By C. H. Duell
his Attorney.

(No Model.) 2 Sheets—Sheet 2.

E. CLIFF.
CAR TRUCK.

No. 539,934. Patented May 28, 1895.

Witnesses:
Mark W. Dewey
A. S. Devey.

Inventor.
Edward Cliff
By C. H. Duell
his Attorney.

UNITED STATES PATENT OFFICE.

EDWARD CLIFF, OF NEWARK, NEW JERSEY.

CAR-TRUCK.

SPECIFICATION forming part of Letters Patent No. 539,934, dated May 28, 1895.

Application filed December 31, 1894. Serial No. 533,423. (No model.)

*To all whom it may concern:*

Be it known that I, EDWARD CLIFF, of Newark, in the county of Essex, in the State of New Jersey, have invented new and useful Improvements in Car-Trucks, of which the following, taken in connection with the accompanying drawings, is a full, clear, and exact description.

My invention relates to certain improvements in electric car trucks, and the object is to provide suitable means, by which the free end of the motor is suspended, that will allow the latter free vertical play and also free lateral movement in every direction, or, so that the free end of the motor may have a free but limited universal movement to relieve the truck from all shocks and for the easy starting of the car.

The invention is applicable to all motor trucks, but is particularly adapted for use with my improved car truck patented January 1, 1895, No. 351,835, as in this truck the axles and wheels are capable of relative and universal movement.

Heretofore the free end of the motor was only capable of free vertical movement and not universal movement, and besides coil springs were used to support the motor at two points engaging with the free end of the motor, while I employ a leaf spring pivoted at its center and engaging the motor at two points, all as hereinafter described and specifically set forth in the claims.

Figures 1, 2:
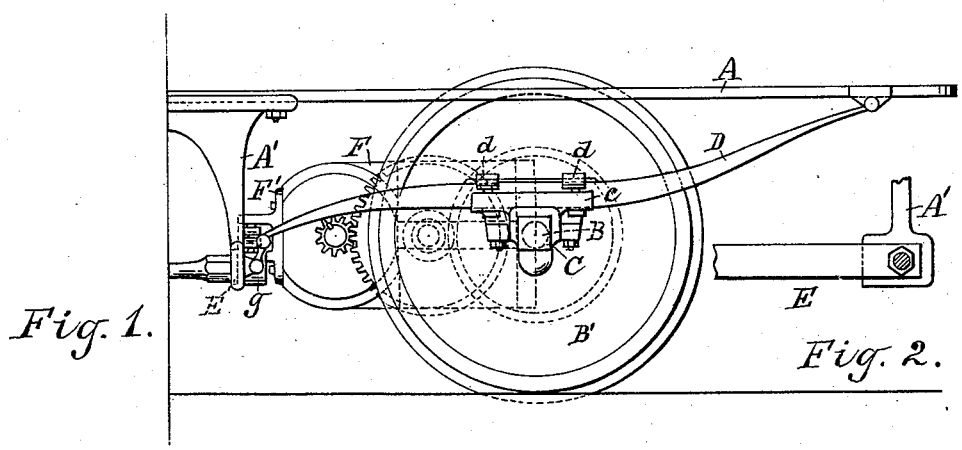
Figure 3:
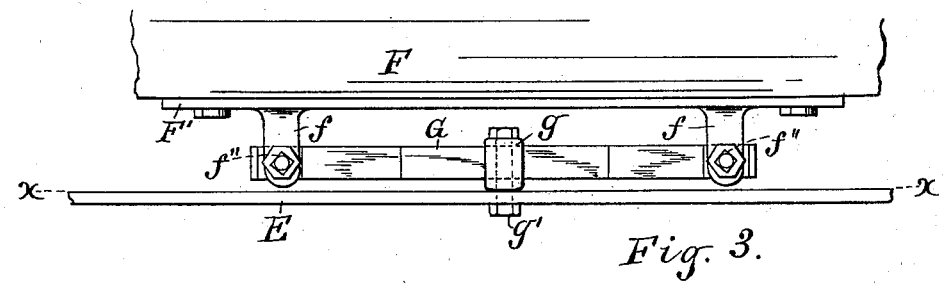
Figures 4, 5:
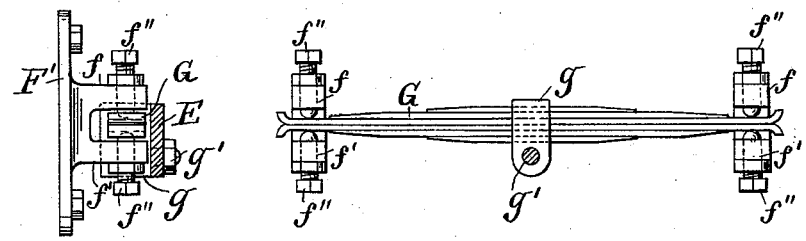

In the drawings accompanying this specification and forming a part hereof, Figure 1 is a side elevation of one-half of my improved truck hereinbefore referred to embodying my present invention. Fig. 2 is a detail view showing more clearly the connection of the cross-bar with the hanger. Fig. 3 is a plan view of the flexible support for the free end of the motor. Fig. 4 is a side elevation of the same, taken on line $x\ x$ of Fig. 3. Fig. 5 is a side view of the same with the cross-bar shown in cross-section; and Figs. 6, 7, 8, and 9 are views of a modified form of my invention similar and corresponding to Figs. 3, 4, and 5, respectively, of the drawings.

Referring specifically to the drawings, A represents the frame upon which the body of the car rests, or what is usually termed the upper or movable frame of a car truck.

B indicates one of the axles.

B' is a wheel rigidly mounted on the axle as usual to turn therewith, and C is an axle-box mounted on the end of the axle for the latter to turn in. The axle-box is provided with a suitable bearing, $c$, for the semi-elliptic spring, D, which is secured thereto by clips, $d, d$, passing around the spring near its center.

A' is a hanger or support for the inner ends of the springs, D, and the cross-bar, E. Said hanger is secured to the frame A of the truck midway between the axles, or at the center, one being on each side of the frame. Upon the depending portion of the hanger is shown secured in a socket one end of the cross-bar, E, to which the motor, F, is connected or secured. The motor, F, may be suspended or mounted upon and geared to the axle, B, in any suitable and well known manner not necessary to be herein described, my invention relating only to the means for suspending the free end of the motor from the cross-bar.

Figure 6:
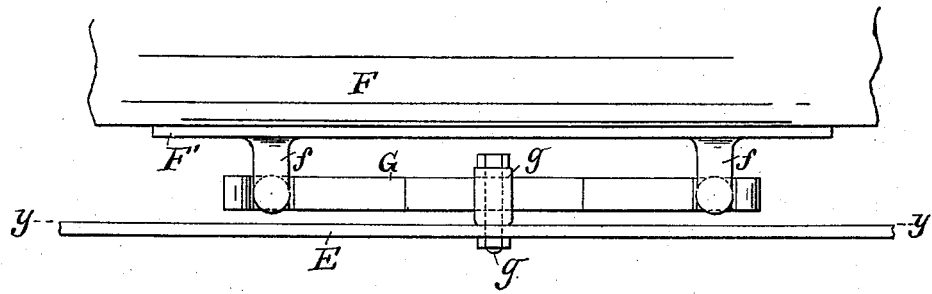
Figures 7, 8:
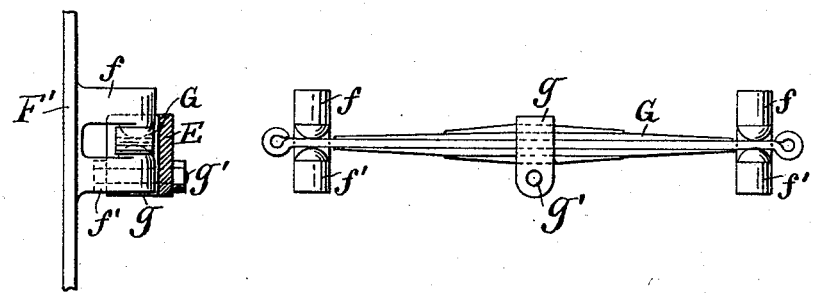

Referring to Figs. 1, 3, 4, and 5 of the drawings, G is a leaf spring composed of two central flat strips of metal longer than the others and of equal length with their ends separated and turned outward to form stops. On each, upper and lower, side of these two leaves are shorter leaves graduated in length to strengthen them. The leaves are all held together at the center by a band, $g$, and this band is provided preferably on its lower side with a projection through which, and the cross-bar, a bolt, $g'$, passes which secures the band to the bar. This bolt forms a pivot on which the spring can rock. Extending outward from a plate, F', secured to the free end of the motor, and toward each end of the said spring, G, are two pairs of lugs, $f, f'$. The lugs are preferably integral with the plate, one of each pair, $f$, extending above the spring and the other, $f'$, of each pair extending below the ends of the spring. The lugs themselves may bear upon the sides of the springs as shown in Figs. 5, 6 and 7, but I preferably provide vertically movable adjustable bolts, $f''$, or screws which pass through the lugs and bear with their rounded ends against the opposite sides of the spring as shown in Figs. 3, 4, and 5, to take up the wear and prevent rattling. If desired only one lug of each pair may be provided with an adjusting bolt. It will be apparent that with this construction the free end of the motor may move universally, the spring can rock on its center, the ends may move both together upward or downward, and the lugs or the bolts in the lugs forming a part thereof may slide laterally in every direction to a limited extent depending upon the flexibility of the springs, D, and G, and the stops on the ends of the latter spring.

Figs. 6, 7 and 8 differ only slightly from the figures described. The spring, G, is shown as having a single long central bar with an eye turned thereon at each end to form the stops for the lugs which, in these figures, as before stated, are without adjusting screws.

Figure 9:
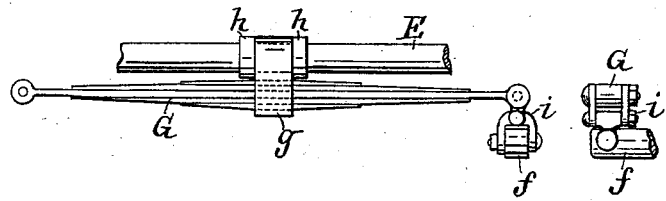

In place of the rectangular cross-bar, E, a round bar may be employed. In that case the band of springs would be supported directly from the cross-bar, as shown in Fig. 9, around which it would be free to swing, being kept in place by collars, h, h. The ends of the springs then could be made saucer shape for ends of adjusting bolts, thus preventing the balls from slipping off, or they could be connected directly to lugs on the motor by means of the old double link hanger, i, also shown in the figure.

I do not wish to be limited to the precise or exact form of construction shown as said construction may be changed in various ways without departing from my invention as will be apparent from the modifications shown.

It will be obvious that the central part of the spring, G, may be secured to the motor and the ends bear on lugs on the cross-bar, just the reverse of the arrangement shown in the drawings.

Having described my invention, what I claim as new, and desire to secure by Letters Patent, is—

1. In a motor car truck, the combination with the frame, the axle and wheels, the cross-bar of the frame and the motor having one end mounted on the axle, of a leaf spring pivoted at its center upon the cross-bar and connected at its ends to the free end of the motor, substantially as described and shown.

2. In a motor car truck, the combination with the frame, the axle and wheels, the cross-bar of the frame and the motor having one end mounted on the axle, of a straight leaf spring mounted at its center upon the cross-bar and extending parallel to the bar, and lugs on the free end of the motor engaging with the ends of the spring and bearing on opposite sides thereof, substantially as described and shown.

3. In a motor car truck, the combination with the frame, the axle and wheels, the cross-bar of the frame and the motor having one end mounted on the axle, of a leaf spring mounted at its center upon the cross-bar, two pairs of lugs extending from the free end of the motor to opposite sides of the ends of said spring, and adjustable bolts extending vertically through said lugs and bearing upon the spring, as and for the purpose described.

4. In a motor car-truck, the combination with the frame, the axle and wheels, the cross-bar of the frame and the motor having one end mounted on the axle, of a leaf spring pivoted at its center upon the cross-bar and extending parallel to the bar, and lugs on the free end of the motor engaging with the ends of the spring and bearing on opposite sides thereof, substantially as described and shown.

5. In a motor car truck, the combination with the frame, the axle and wheels, the cross-bar of the frame and the motor having one end mounted on the axle, of a spring composed of leaves graduated in length on each side, the central leaf or leaves being the longest and having lateral projections at its ends, mounted at its center upon said cross-bar and extending parallel to the bar, and two pairs of lugs on the free end of the motor engaging the ends of the spring and bearing on opposite sides thereof, substantially as described and shown.

In testimony whereof I have hereunto signed my name.

EDWARD CLIFF. [L. S.]

Witnesses:
E. L. TODD,
W. H. GRAHAM.